(12) United States Patent
Park et al.

(10) Patent No.: US 7,973,430 B2
(45) Date of Patent: Jul. 5, 2011

(54) POWER SUPPLY

(75) Inventors: Jun Ho Park, Gumi-si (KR); Dong Young Huh, Bucheon-si (KR)

(73) Assignee: LG Innotek Co., Ltd., Seoul (KR)

( * ) Notice: Subject to any disclaimer, the term of this patent is extended or adjusted under 35 U.S.C. 154(b) by 213 days.

(21) Appl. No.: 12/370,963

(22) Filed: Feb. 13, 2009

(65) Prior Publication Data

US 2009/0201707 A1    Aug. 13, 2009

(30) Foreign Application Priority Data

Feb. 13, 2008    (KR) .................. 10-2008-0013127

(51) Int. Cl.
*H02J 1/00* (2006.01)
*G05F 9/06* (2006.01)

(52) U.S. Cl. ........................... 307/82; 307/154

(58) Field of Classification Search ............... 307/82, 307/154

See application file for complete search history.

(56) References Cited

U.S. PATENT DOCUMENTS 7,279,808 B2 * 10/2007 Marchand et al. ............ 307/31
7,768,801 B2 *  8/2010 Usui et al. ............... 363/21.06

OTHER PUBLICATIONS

Kang et al. (2007). Operating Characteristics of LLC Series Resonant Converter. *The Transactions of the Korean Institute of Power Electronics*, 12:6, 472-482. Republic of Korea.

* cited by examiner

*Primary Examiner* — Robert L. Deberadinis
(74) *Attorney, Agent, or Firm* — Saliwanchik, Lloyd & Eisenschenk

(57) ABSTRACT

A power supply is provided. The power supply comprises: a power input unit switching an input power; a transformer unit inducing an output power of the power input unit to a secondary side; a first power output unit connected to a first coil of the secondary side of the transformer unit; a second power output unit connected to a part of the first coil of the secondary side of the transformer unit; a synchronization signal detecting unit connected to a third coil of the secondary side of the transformer unit and detecting a switching period of the power input unit; and a synchronization signal output unit controlling an operation of the second power output unit according to the detected signal of the synchronization signal detecting unit.

20 Claims, 6 Drawing Sheets

POWER SUPPLY

CROSS-REFERENCE TO RELATED APPLICATION

The present application claims the benefit under 35 U.S.C. §119 of Korean Patent Application No. 10-2008-00113127, filed Feb. 13, 2008, which is hereby incorporated by reference in its entirety.

BACKGROUND

A power supply comprises a switching mode power supply (SMPS) which receives a DC voltage from a power metal-oxide-semiconductor field effect transistor (MOSFET) (e.g., double diffused MOSFET (DMOSFET)) and converts the received DC voltage into a square-wave voltage. In this way, a stable power supply having high efficiency can be provided by controlling the supply of the output power.

As flat panel displays such as a plasma display panel (PDP) or a liquid crystal display (LCD) are highly integrated, the SMPS is increasingly used as an essential part of the flat panel displays. Therefore, many attempts to miniaturization and lightweight of the SMPS have been made.

BRIEF SUMMARY

Embodiments provide a power supply which is capable of supplying multi-powers through a single transformer unit.

Embodiments also provide a power supply which is capable of synchronizing some of the multi-powers of the transformer unit with a switching period of an input power.

Embodiments provide a power supply which is capable of controlling an average power of the multi-powers outputted from a single transformer.

An embodiment provides a power supply comprising: a power input unit switching an input power; a transformer unit inducing an output power of the power input unit to a secondary side; a first power output unit connected to a first coil of the secondary side of the transformer unit; a second power output unit connected to a part of the first coil of the secondary side of the transformer unit; a synchronization signal detecting unit connected to a third coil of the secondary side of the transformer unit and detecting a switching period of the power input unit; and a synchronization signal output unit controlling an operation of the second power output unit according to the detected signal of the synchronization signal detecting unit.

An embodiment provides a power supply comprising: a power input unit switching an input power; a transformer unit inducing an output power of the power input unit to a coil of a secondary side; a first power output unit connected to the secondary side of the transformer unit; a second power output unit connected to the secondary side of the transformer unit; a synchronization signal detecting unit connected to a third coil of the secondary side of the transformer unit and detecting a switching-on time signal of the power input unit; and a synchronization signal output unit controlling an operation of the second power output unit according to the switching-on time signal detected by the synchronization signal detecting unit.

An embodiment provides a power supply comprising: a switching unit comprising a plurality of switching elements switching an input power; a transformer unit inducing an output power of the switching unit to a secondary side; a first power output unit outputting a first voltage induced in the secondary side of the transformer unit; a second power output unit switching the voltage induced in the secondary side of the transformer unit to output a second power; a synchronization signal detecting unit detecting a period of the switching voltage outputted from the switching unit; and a synchronization signal output unit controlling an operation of the switching output of the second power output unit according to a synchronization signal detected by the synchronization signal detecting unit.

The details of one or more embodiments are set forth in the accompanying drawings and the description below. Other features will be apparent from the description and drawings, and from the claims.

DETAILED DESCRIPTION

Reference will now be made in detail to the embodiments of the present disclosure, examples of which are shown in the accompanying drawings.

Figure 1:
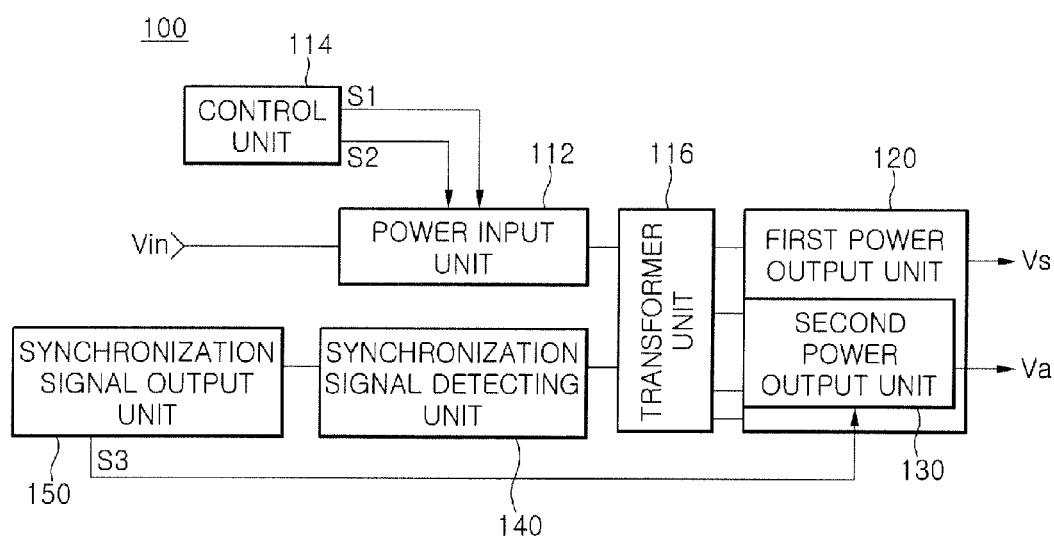
FIG. 1 is a block diagram of a power supply according to a first embodiment.

FIG. 1 is a block diagram of a power supply according to a first embodiment.

Referring to FIG. 1, the power supply 100 comprises a power input unit 112, a control unit 114, a transformer unit 116, a first power output unit 120, a second power output unit 130, a synchronization signal detecting unit 140, and a synchronization signal output unit 150. The power supply 100 functions as a DC-DC converter.

The power input unit 112 converts an input power Vin into an AC voltage having a corresponding frequency in response to control signals S1 and S2 outputted from the control unit 114. The control unit 114 outputs the control signals S1 and S2 to allow a constant voltage to be supplied to a load by a pulse width modulation (PWM) signal.

The transformer unit 116 boosts the AC voltage applied from the power input unit 112 based on a turn ratio of a primary side to a secondary side.

The first power output unit 120 rectifies and smoothes the voltage induced in the secondary side of the transformer unit 116, and supplies the rectified and smoothed voltage as a first power Vs to a first load. The second power output unit 130 rectifies the voltage induced in the secondary side of the transformer unit 116, and supplies the rectified voltage as a second power Va by using a boost converter. The second power output unit 130 is connected to some winding of the secondary side of the transformer unit 116, and converts some voltage induced from the transformer unit 116 into power required in a second load.

The synchronization signal detecting unit 140 detects a period of the voltage induced in the transformer unit 116, that is, switching-on time information. The synchronization signal output unit 150 outputs a third control signal S3 according to the period of the voltage detected by the synchronization signal detecting unit 140. That is, the synchronization signal detecting unit 140 detects the switching period of the power input unit 112, and the synchronization signal output unit 150 outputs the third control signal S3 corresponding to the switching period.

The third control signal S3 of the synchronization signal output unit 150 controls the switching operation of the second power output unit 130, and the second power output unit 130 is turned on/off in response to the third control signal S3 to output the second power Va in a switching manner. Since the switching period of the second power output unit 130 is synchronized with the switching period of the power input unit 112, the synchronization signal output unit 150 can minimize the variation of the voltage Va outputted from the second power output unit 130. Furthermore, when much current flows through the load connected to the second power output unit 130 and the variation of the load is large, it is possible to reduce the variation of the second power Va of the second power output unit 130.

The second power Va of the second power output unit 130 is synchronized with the switching period of the power input unit 112, and its frequency is two times the switching frequency of the input power Vin.

Figure 2:
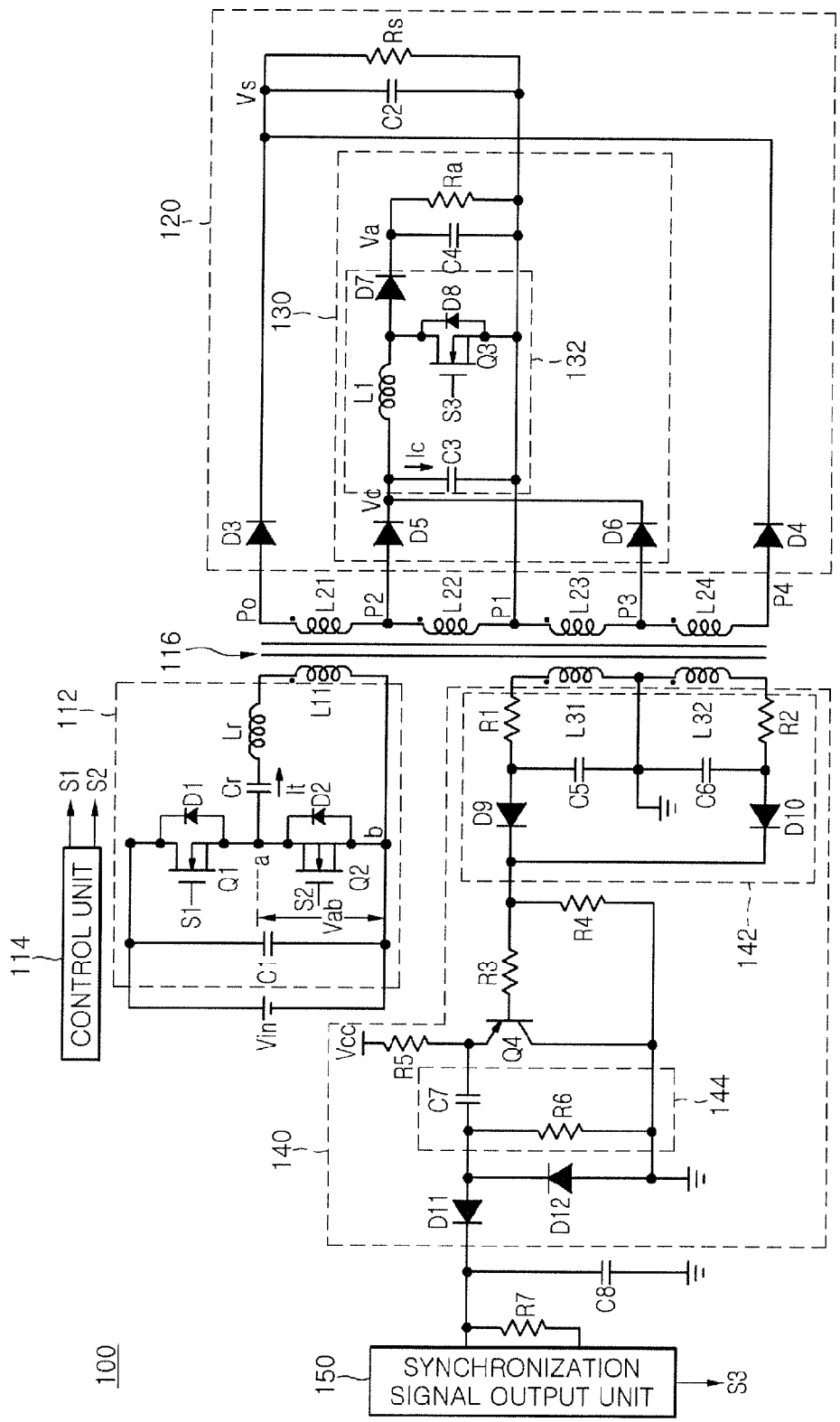
FIG. 2 is a circuit diagram of the power supply shown in FIG. 1.

FIG. 2 is a circuit diagram of the power supply shown in FIG. 1.

Referring to FIG. 2, the power input unit 112 is connected to a primary coil L11 of the transformer unit 116 and comprises a first capacitor C1, a first switching element Q1, a second switching element Q2, a resonant capacitor Cr, and a resonant inductor Lr.

The first capacitor C1 charges or discharges the input power Vin, and the first switching element Q1 and the second switching element Q2 start to operate when the charged voltage reaches an operating voltage.

The first switching element Q1 and the second switching element Q2 are alternately turned on/off by the first and second control signals S1 and S2 of the control unit 114. The first switching element Q1 and the second switching element Q2 are connected complementarily and symmetrically, and alternately output the input power Vin in a switching manner. When the first switching element Q1 is in an on period, the second switching element Q2 is in an off period. On the other hand, when the first switching element Q1 is in an off period, the second switching element Q2 is in an on period.

The first control signal S1 and the second control signal S2 outputted from the control unit 114 are out of phase. The first switching element Q1 is repetitively turned on/off according to the level of the first control signal S1, and the output of the first switching element Q1 repeats a high voltage and a low voltage. Since the first switching element Q1 and the second switching element Q2 are alternately turned on/off, the voltage is applied across the primary coil L11 of the transformer unit 116.

The first switching element Q1 and the second switching element Q2 output a square-wave AC voltage by switching the input power Vin. Although the first switching element Q1 and the second switching element Q2 are connected in a half bridge configuration, the present invention is not limited thereto. For example, the first switching element Q1 and the second switching element Q2 may be connected in a full bridge configuration.

Under control of the control unit 114, the first and second switching elements Q1 and Q2 used in the half bridge are controlled by a pulse width modulation (PWM) or pulse frequency modulation (PFM) scheme. The first and second switching elements Q1 and Q2 can be implemented with high-power MOSFETs. Moreover, in the power input unit 112, a plurality of switching elements may be implemented with a full bridge circuit.

A power factor correction (PFC) circuit may be disposed between the first and second switching elements Q1 and Q2 and the first capacitor C1, and the PFC circuit can improve the power factor of the input power Vin.

The resonant capacitor Cr and the resonant inductor Lr are serially connected at a connection node "a" of the first switching element Q1 and the second switching element Q2. The resonant capacitor Cr and the resonant inductor Lr are connected to the primary coil L11 of the transformer unit 116 to thereby constitute an LLC resonant circuit. The inductance of the LLC resonant circuit may use a leakage inductance and an excitation inductance of the primary coil L11 of the transformer unit 116.

The switching outputs of the first switching element Q1 and the second switching element Q2 flows through the primary coil L11 of the transformer unit 116 by the LLC resonant circuit.

The voltage applied across the primary coil L11 of the transformer unit 116 is induced in the first coils L21, L22, L23 and L24 of the secondary side, and the voltage induced in the first coils L21, L22, L23 and L24 of the secondary side is converted according to the turn ratio of the primary coil L11 and the first coils L21, L22, L23 and L24 of the secondary side. The converted voltage is outputted through the first power output unit 120 and the second power output unit 130.

The first coils L21, L22, L23 and L24 of the secondary side of the transformer unit 116 are divided by the connections of a plurality of taps P1, P2 and P3. The coils L21 and L22 and the coils L23 and L24 are divided by terminals P0 and P4 of the first coils and the center tap P1. The coil L21 and the coil L22 are divided by the first intermediate tap P2, and the coil L23 and the coil L24 are divided by the second intermediate tap P3.

The center tap P1 of the first coils L21, L22, L23 and L24 of the secondary side is a ground terminal or a negative polarity terminal, and the intermediate taps P2 and P3 are connected between the center tap P1 and terminals P0 and P4 respectively.

In the first coils L21, L22, L23 and L24 of the secondary side of the transformer unit 116, the coil L21 and the coil L24 are connected to the first power output unit 120, and the coil L22 and the coil L23 are connected to the second power output unit 130.

The first power output unit 120 is connected to the first coils L21, L22, L23 and L24 of the secondary side of the transformer unit 116 in a full-wave rectification configuration. The second power output unit 130 is connected to some coils L22 and L23 among the first coils L21, L22, L23 and L24 of the secondary side of the transformer unit 116 in a full-wave rectification configuration.

The first power output unit 120 comprises diodes D3 and D4, a capacitor C2, and a first load resistor Rs.

The diodes D3 and D4 of the first power output unit 120 full-wave rectify the voltage induced in the first coils L21 and L24 of the secondary side of the transformer unit 116. The second capacitor C2 smoothes the rectified voltage to output it to the first load resistor Rs. Although the first power output unit 120 constitutes a full-wave rectifier circuit with the two diodes D3 and D4, the present invention is not limited thereto. For example, the full-wave rectification can be achieved by a bridge circuit.

The second power output unit 130 comprises diodes D5 and D6, a boost converter 132, a fourth capacitor C4, and a second load resistor Ra. The diodes D5 and D6 are connected to the first coils L22 and L23 of the secondary side of the transformer unit 116, and full-wave rectify the voltage induced in the coils L22 and L23. Although the second power output unit 130 constitutes a full-wave rectifier circuit with the two diodes D5 and D6, the present invention is not limited thereto. For example, the full-wave rectification can be achieved by a bridge circuit.

The fifth diode D5 rectifies the AC voltage induced in the coil L22 of the secondary side of the transformer unit 116, and the sixth diode D6 rectifies the AC voltage induced in the coil L23 of the secondary side of the transformer unit 116. The voltage rectified by the fifth and sixth diodes D5 and D6 is boosted by the boost converter 132. Then, the boosted voltage is smoothed by the fourth capacitor C4 and supplied to the second load resistor Ra.

The boost converter 132 comprises a third capacitor C3, a first inductor L1, a third switching element Q3, and a seventh diode D7, and functions as a boost converter. The third capacitor C3 is connected in parallel to a connection node of the fifth and sixth diodes D5 and D6. The one terminal of the third capacitor C3 is connected to the center tap P1. The first inductor L1 and the seventh diode D7 are connected in series to the connection node of the fifth and sixth diodes D5 and D6. The third switching element Q3 is connected in parallel between the first inductor L1 and the seventh diode D7 and is turned on/off. Accordingly, a current can periodically flow through the second load resistor Ra, and the second power Va higher than the input power Vc to the boost converter 132 is outputted.

The first power Vs of the first power output unit 120 may be used as a sustain voltage of a display device, and the second power Va of the second power output unit 130 may be used as an address voltage. The display device may be a PDP, and the power supply supplies the PDP with a plurality of low voltages and a high voltage necessary for plasma discharge. In this case, the high voltage comprises the sustain voltage and the address voltage. Accordingly, the first power Vs may be supplied as the sustain voltage, and the second power Va may be supplied as the address voltage.

The synchronization signal detecting unit 140 comprises a rectifier circuit 142, a fourth switching element Q4, and a differential circuit 144.

The rectifier circuit 142 is connected to third coils L31 and L32 of the secondary side of the transformer unit 116 in a center tap configuration. The rectifier circuit 142 detects the voltage induced in the third coils L31 and L32 through the first and second resistors R1 and R2. The detected voltage is smoothed through the capacitors C5 and C6 and is fill-wave rectified by the diodes D9 and D10. The voltage rectified through the rectification diodes D9 and D10 is transferred to a base and an emitter of the fourth switching element Q4 through the resistors R3 and R4. The fourth switching element Q4 is a PNP type switching element which is switched to output a power supply voltage Vcc connected to a collector by a signal applied to its base.

The output of the fourth switching element Q4 is outputted as a triangular wave signal by the capacitor C7 and the resistor R6 of the differential circuit 144. The triangular wave signal serves as a synchronization detection signal and is transferred to the synchronization signal output unit 150. Diodes D11 and D12 connected to an output terminal of the differential circuit 144 are used for circuit protection purposes.

The synchronization signal detected by the synchronization signal detecting unit 140 corresponds to the switching-on time period of the first switching element Q1 and the second switching element Q2.

The synchronization signal output unit 150 outputs the third control signal S3 to the third switching element Q3 of the second power output unit 130 according to the synchronization signal detected by the synchronization signal detecting unit 140. The third control signal S3 of the synchronization signal output unit 150 is used to control the switching-on period of the third switching element Q3.

The third switching element Q3 of the boost converter 132 of the second power output unit 130 is turned on/off in response to the third control signal S3 to boost the voltage rectified through the diodes D5 and D6.

The signal detected by the synchronization signal detecting unit 140 is used to detect the period of the voltage induced in the primary coil L11 of the transformer unit 116. This signal is a signal that is synchronized with the switching-on time of the first switching element Q1 and the second switching element Q2. Accordingly, the synchronization signal output unit 150 outputs the third control signal S3 corresponding to the period of the signal detected by the synchronization signal detecting unit 140. The third control signal S3 is used to control the switching-on time of the third switching element Q3 of the second power output unit 130. In this case, since the switching-on time of the third switching element Q3 is synchronized with the switching-on time of the first switching element Q1 and the second switching element Q2, it is possible to minimize the phenomenon that the input power voltage Vc of the second output/unit 130 is changed according to the variation of the first load resistor Rs.

The power supply 100 supplies the first power Vs and the second power Va by using the transformer unit 116. Furthermore, since the third switching element Q3 is enabled at a time point when the first switching element Q1 and the second switching element Q2 are enabled, the first switching element Q1, the second switching element Q2 and the third switching element Q3 are synchronized to perform the switching operations.

When the power supply 100 is applied to the PDP, the second load operates as a light load when the first load is a heavy load. On the other hand, the second load operates a heavy load when the first load is a light load. By synchronizing the switching of the second load with the primary switching period of the transformer unit 116, the first load and the second load can be controlled with the average power according to the load characteristic of the PDP.

Meanwhile, the frequency of the switching signal of the third switching element Q3 is two times the frequency of the switching signal of the first switching element Q1 and the frequency of the switching signal of the second switching element Q2.

Figure 3:
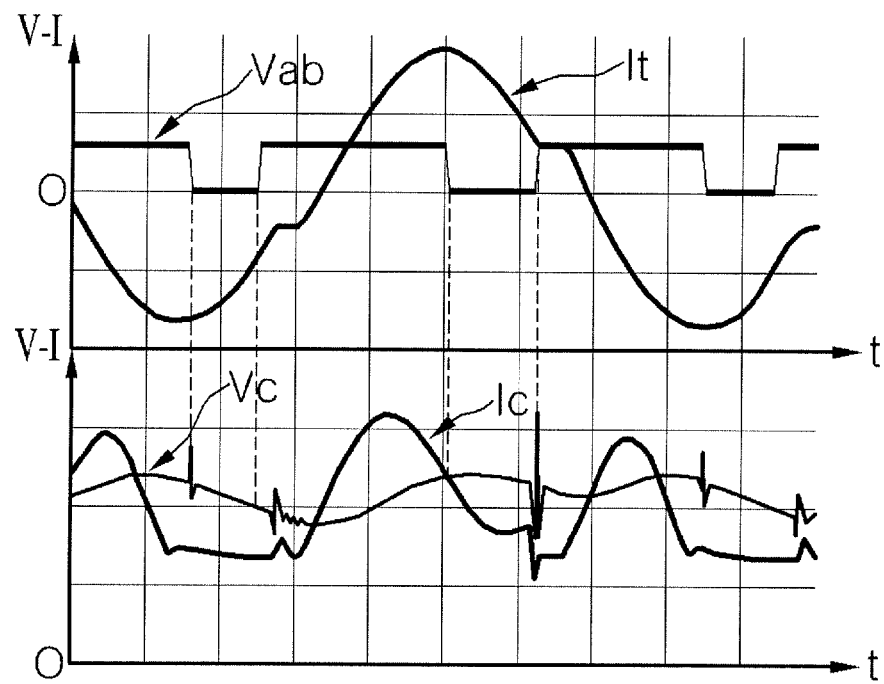
FIG. 3 is an output waveform diagram showing an input power and a second power under a first load condition upon asynchronous control of third switching element of FIG. 2.

FIG. 3 is a waveform diagram illustrating a voltage and current of the power input unit and a voltage and current of the second power output unit under the first load condition upon the asynchronous control of the third switching element of FIG. 2.

Referring to FIG. 3, the first switching element Q1, the second switching element Q2, and the third switching element Q3 are asynchronously operated. The input power Vab is a voltage applied across the second switching element Q2, and the input current It is a current flowing through the resonant capacitor Cr.

The output power and the output current of the second power output unit 130 represent the voltage Vc and the current Ic of the third capacitor C3.

Under the first load condition, the first load resistor Rs of the first power output unit 120 operates as a heavy load (e.g., 250 W), and the second load resistor Ra of the second power output unit 130 operates as the light load (e.g., 125 W).

Figure 4:
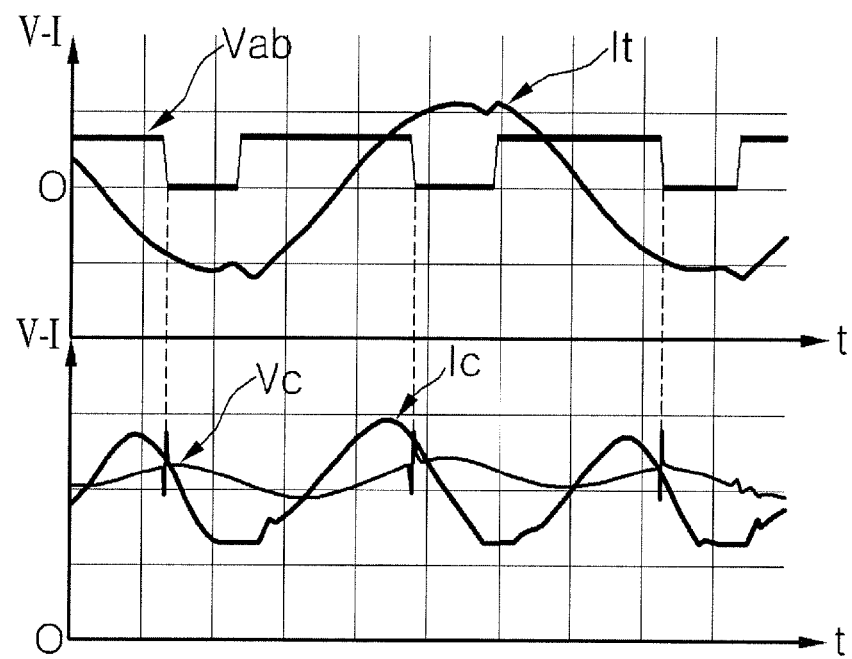
FIG. 4 is an output waveform diagram showing an input power and a second power under a second load condition upon asynchronous control of third switching element of FIG. 2.

FIG. 4 is a waveform diagram illustrating a voltage and current of the power input unit and a voltage and current of the second power output unit under the second load condition upon the asynchronous control of the third switching element of FIG. 2.

Referring to FIG. 4, the voltage Vab and the current It of the power input unit 112 and the voltage Vc and the current Ic of the second power output unit 130 were measured under the second load condition. Under the second load condition, the load of the first power output unit 120 operates as a light load (e.g., 10 W), and the load of the second power output unit 130 operates as a heavy load (e.g., 125 W).

Figure 5:
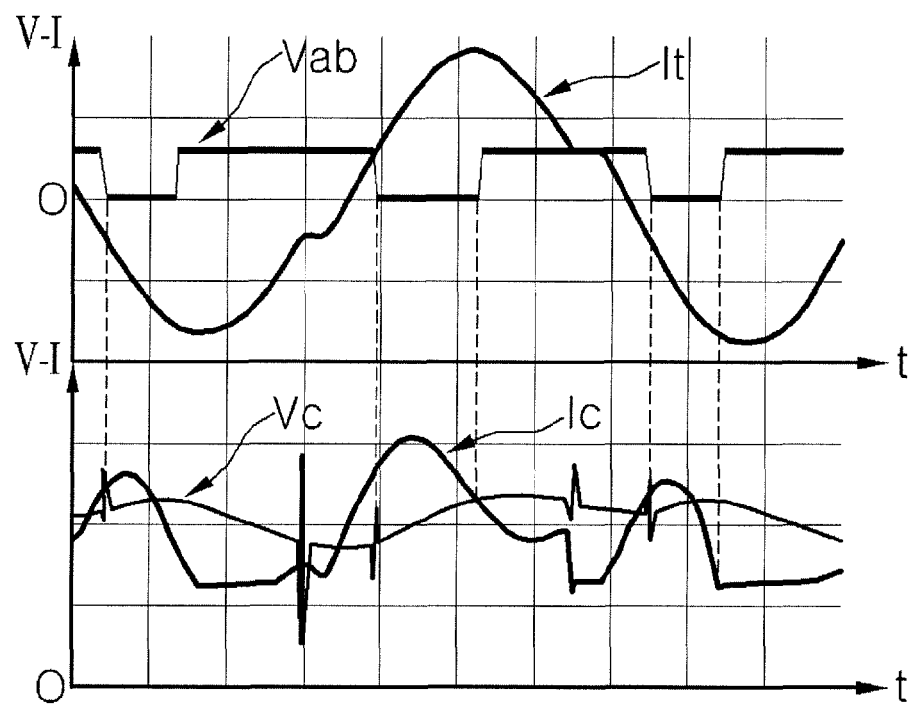
FIG. 5 is an output waveform diagram showing an input power and a second power under a first load condition upon synchronous control of third switching element of FIG. 2.

FIG. 5 is a waveform diagram illustrating a voltage and current of the power input unit 112 and a voltage and current of the second power output unit 130 under the first load condition upon the synchronous control of the third switching element of FIG. 2.

Referring to FIG. 5, the first switching element Q1, the second switching element Q2, and the third switching element Q3 are synchronously operated. The input power of the power input unit 112 is a voltage Vab applied across the second switching element Q2, and the input current is a current It flowing through the resonant capacitor Cr. The voltage Vc and the current k of the third capacitor C3 of the second power output unit 130 were measured.

Under the first load condition, the load of the first power output unit 120 operates a heavy load (e.g., 250 W), and the load of the second power output unit 130 operates as a light load (e.g., 125 W).

Figure 6:
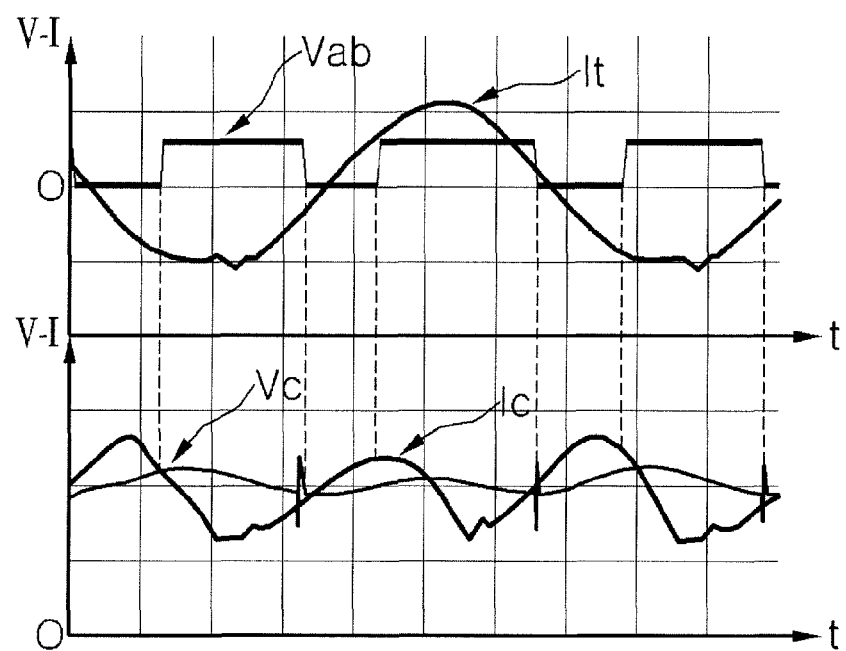
FIG. 6 is an output waveform diagram showing an input power and a second power under a second load condition upon synchronous control of third switching element of FIG. 2.

FIG. 6 is a waveform diagram illustrating a voltage and current of the power input unit 112 and a voltage and current of the second power output unit 130 under the second load condition upon the synchronous control of the third switching element of FIG. 2.

Referring to FIG. 6, the voltage Vab and the current It of the power input unit 112 and the voltage Vc and the current Ic of the second power output unit 130 were measured under the second load condition. Under the second load condition, the load of the first power output unit 120 operates as a light load (e.g., 10 W), and the load of the second power output unit 130 operates as a heavy load (e.g., 125 W).

As shown in FIGS. 5 and 6, the switching-on time of the third switching element Q3 is synchronized with the switching-on time of the first and second switching elements Q1 and Q2. Thus, compared with the asynchronous control, the current Ic of the third capacitor C3 of the second power output unit 130 is reduced by about 0.3-0.7 A in all load ranges. When the third switching element Q3 of the second power output unit 130 performs the switching operation in the discontinuous period of the resonant current of the power input unit 112 under the asynchronous control, the voltage to be supplied from the power input unit 112 is blocked. Thus, ripple current of the third capacitor C3 of the second power output unit 130 increases. The power supply according to the current embodiment can inhibit the increase of the ripple current.

Figure 7:
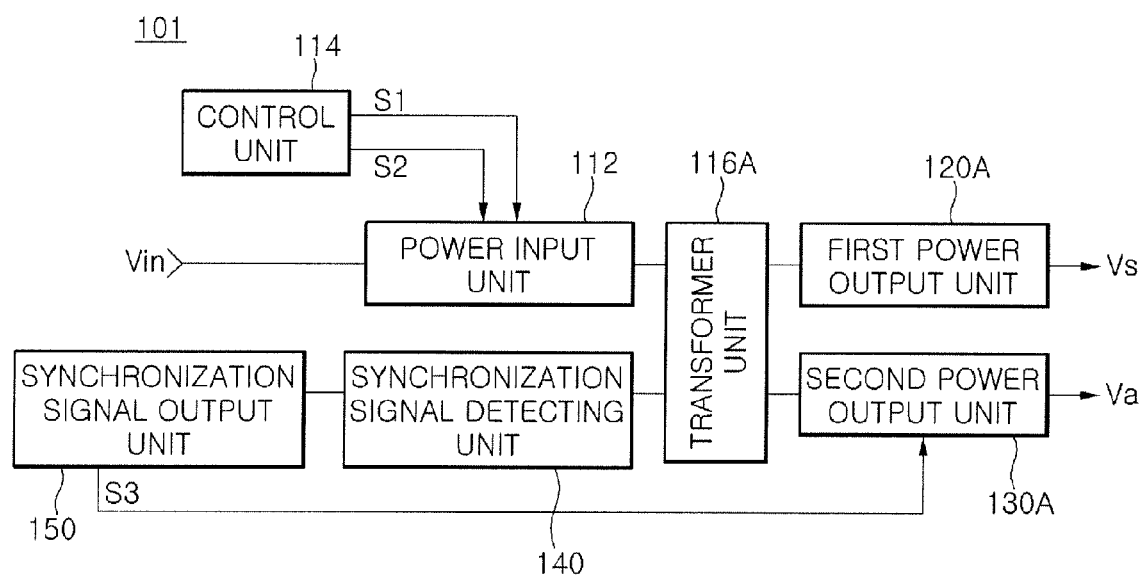
FIG. 7 is a block diagram of a power supply according to a second embodiment.

FIG. 7 is a block diagram of a power supply according to a second embodiment. Duplicate description about the same parts as the first embodiment will be omitted.

Referring to FIG. 7, the power supply 101 comprises a power input unit 112, a control unit 114, a transformer unit 116A, a first power output unit 120A, a second power output unit 130A, a synchronization signal detecting unit 140, and a synchronization signal output unit 150.

The power input unit 112 is connected to the primary side of the transformer unit 116A. The first power output unit 120A and the second power output unit 130A are separately connected to the secondary side of the transformer unit 116A.

The synchronization signal detecting unit 140 and the synchronization signal output unit 150 were described with respect to the first embodiments, and detailed description thereof will be omitted.

The synchronization signal output unit 150 outputs the third control signal S3 to the second power output signal 130A, and the second power output unit 130A outputs the voltage in synchronization with the switching-on time of the input power in a switching manner.

Figure 8:
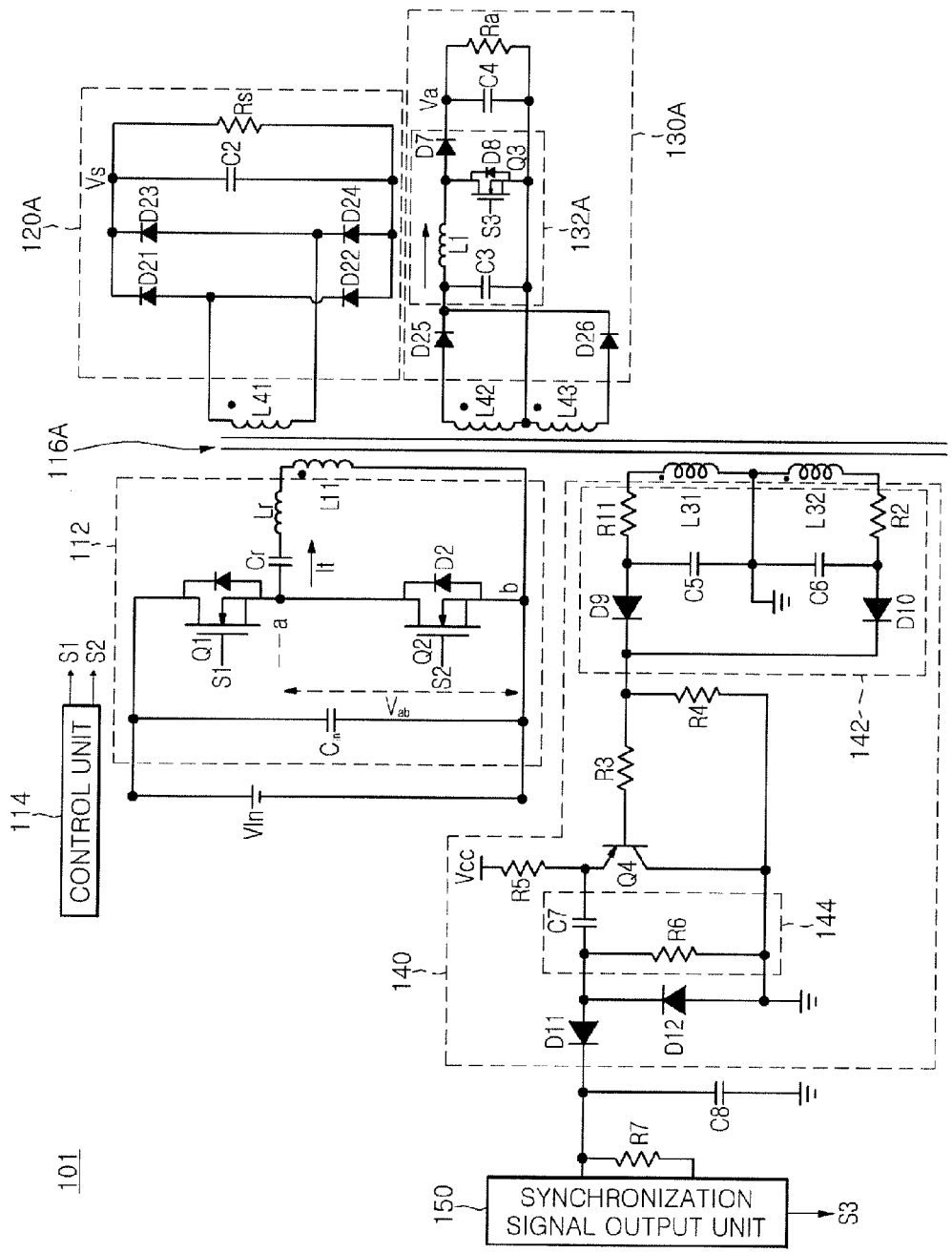
FIG. 8 is a circuit diagram of the power supply shown in FIG. 7.

FIG. 8 is a circuit diagram of the power supply shown in FIG. 7.

Referring to FIG. 8, in the power input unit 112, the first switching element Q1 and the second switching element Q2 are turned on/off in response to the first control signal S1 and the second control signal S2 outputted from the control unit 114, so that the input power Vin is alternately outputted.

The power input unit 112 flows the switching voltage to the primary coil L11 of the transformer unit 116A through the LLC resonant circuit formed by Cr, Lr and L11, and the voltage applied across the primary coil L11 of the transformer unit 116A is induced in the first coil L41, the second coils L42 and L43, and the third coils L31 and L32 of the secondary side of the transformer unit 116A.

The first power output unit 120A is connected to the first coil L41 of the secondary side of the transformer unit 116A. The first power output unit 120A performs a full-wave rectification by using diodes D21, D22, D23 and D24, and the full-wave rectified voltage is smoothed by the second capacitor C2 and supplied as the first power Vs to the first load resistor Rs. Although the diodes D21, D22, D23 and D24 constitute a bridge rectifier circuit, the present invention is not limited thereto. For example, the rectifier circuit can be implemented with two diodes in a center tap configuration.

The second power output unit 130A is connected to the second coils L42 and L43 of the secondary side of the transformer unit 116A, and the second power output unit 130A is connected to the second coils L42 and L43 in a center tap configuration. The second power output unit 130A uses the diodes D25 and D26 to rectify the voltage induced across the second coils L42 and L43 of the secondary side of the transformer unit 116. The rectified voltage is boosted through a boost converter 132A, and the second power Va is outputted to the second load resistor Ra through the fourth capacitor C4. The diodes D25 and D26 of the second power output unit 130A constitute a full-wave rectifier circuit, but the present invention is not limited thereto.

Since the switching-on time is controlled by the third control signal S3 of the synchronization signal output unit 150, the second power output unit 130A is synchronized with the switching-on time of the first switching element Q1 and the second switching element Q2. Accordingly, the second power output unit 130A can stably output the voltage, without being influenced by the load variation of the first power output unit 120A.

Furthermore, the first power output unit 120A is synchronized with the synchronization signals of the first and second switching elements Q1 and Q2, and the second power output unit 130A is synchronized by the third control signal S3 of the synchronization signal output unit 150. Thus, the average power of the first power output unit 120A and the second power output unit 130A can be controlled.

Any reference in this specification to "one embodiment," "an embodiment," "example embodiment," etc., means that a particular feature, structure, or characteristic described in connection with the embodiment is comprised in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power supply comprising:
   a power input unit switching an input power;
   a transformer unit inducing an output power of the power input unit to a secondary side;
   a first power output unit connected to a first coil of the secondary side of the transformer unit;
   a second power output unit connected to a part of the first coil of the secondary side of the transformer unit;
   a synchronization signal detecting unit connected to a third coil of the secondary side of the transformer unit and detecting a switching period of the power input unit; and
   a synchronization signal output unit controlling an operation of the second power output unit according to the detected signal of the synchronization signal detecting unit.

2. The power supply of claim 1, wherein the power input unit comprises a plurality of switching elements connected complementarily and symmetrically to alternately output the input power.

3. The power supply of claim 2, wherein the power input unit further comprises an LLC resonant circuit transferring outputs of the plurality of switching elements to a primary coil of the transformer unit.

4. The power supply of claim 1, wherein the first power output unit is connected to end terminals of the first coil of the secondary side of the transformer unit and a center tap, and the second power output unit is connected to the center tap of the first coil of the secondary side of the transformer unit and an intermediate tap.

5. The power supply of claim 1, wherein the first power output unit and the second power output unit are connected to the first coil of the secondary side of the transformer unit in a full-wave rectification manner.

6. The power supply of claim 1, wherein the first power output unit comprises:
   a diode to full-wave rectifying a voltage induced across the first coil; and
   a capacitor smoothing an output of the diode.

7. The power supply of claim 1, wherein the second power output unit comprises:
   a rectification diode connected to an intermediate tap of the first coil of the secondary side of the transformer unit to full-wave rectify an intermediate tap input power;
   a boost converter boosting up an output of the rectification diode; and
   a capacitor smoothing an output of the boost converter.

8. The power supply of claim 7, wherein the boost converter comprises:
   a capacitor connected at an output node of the diode;
   an inductor connected at one end to the output node of the diode;
   a circuit protection diode connected in series with the indicator; and
   a switching element connected between the inductor and the circuit protection diode and turned on/off by an output signal of the synchronization signal output unit.

9. The power supply of claim 1, wherein the synchronization signal detecting unit comprises:
   a rectifier circuit rectifying a voltage induced in the third coil of the secondary side of the transformer unit;
   a fourth switching element switched according to the rectified signal of the rectifier circuit; and
   a differential circuit converting an output of the fourth switching element into a triangular wave signal and outputting the triangular wave signal to the synchronization signal output unit.

10. The power supply of claim 1, wherein an output power of the first power output unit is supplied as a sustain voltage of a plasma display panel, and an output power of the second power output unit is supplied as an address voltage of the plasma display panel.

11. A power supply comprising:
    a power input unit switching an input power;
    a transformer unit inducing an output power of the power input unit to a secondary side;
    a first power output unit connected to the secondary side of the transformer unit;
    a second power output unit connected to the secondary side of the transformer unit;
    a synchronization signal detecting unit connected to a third coil of the secondary side of the transformer unit and detecting a switching-on time signal of the power input unit; and
    a synchronization signal output unit controlling an operation of the second power output unit according to the switching-on time signal detected by the synchronization signal detecting unit.

12. The power supply of claim 11, wherein the power input unit comprises a plurality of switching elements connected in a half bridge or full bridge configuration.

13. The power supply of claim 11, wherein the first power output unit and the second power output unit are connected to the same coil or different coils of the secondary side of the transformer unit.

14. The power supply of claim 11, wherein the first power output unit and the second power output unit comprise a rectifier circuit full-wave rectifying a voltage induced in the secondary side of the transformer unit.

15. The power supply of claim 11, wherein the second power output unit comprises a boost converter synchronized with the switching-on time signal of the power input unit by a control signal of the synchronization signal output unit.

16. The power supply of claim 11, wherein an output frequency of the second power output unit is two times a frequency of a voltage applied to a primary side of the transformer unit.

17. The power supply of claim 11, wherein the synchronization signal detecting unit comprises:
- a rectifier circuit connected to the third coil of the secondary side of the transformer unit in a center tap configuration;
- a fourth switching element switched on/off according to an output of the rectifier circuit; and
- a differential circuit connected to an output terminal of the fourth switching element.

18. A power supply comprising:
- a switching unit comprising a plurality of switching elements switching an input power;
- a transformer unit inducing an output power of the switching unit to a secondary side;
- a first power output unit outputting a first power induced in the secondary side of the transformer unit;
- a second power output unit outputting a voltage induced in the secondary side of the transformer unit to output a second power;
- a synchronization signal detecting unit detecting a period of a switching voltage outputted from the switching unit; and
- a synchronization signal output unit controlling an operation of the switching output of the second power output unit according to a synchronization signal detected by the synchronization signal detecting unit,
- wherein the second power output unit and the synchronization signal detecting unit are connected to different coils of the transformer unit.

19. The power supply of claim 18, wherein the first power output unit and the second power output unit are connected to one coil or different coils of the secondary side of the transformer unit.

20. The power supply of claim 18, wherein the second power output unit comprises:
- a rectification diode full-wave rectifying the voltage induced in the secondary side of the transformer unit;
- a boost converter turning on/off an output of the rectification diode by the synchronization signal output unit; and
- a capacitor smoothing an output of the boost converter.

* * * * *